United States Patent [19]

Engelsmann et al.

[11] 4,165,166
[45] Aug. 21, 1979

[54] EXPOSURE CONTROLS FOR PHOTOGRAPHIC APPARATUS

[75] Inventors: Dieter Engelsmann, Unterhaching; Hubert Hackenberg, Munich; Rolf Schröder, Baldham, all of Fed. Rep. of Germany

[73] Assignee: AGFA-Gevaert A.G., Leverkusen, Fed. Rep. of Germany

[21] Appl. No.: 898,339

[22] Filed: Apr. 20, 1978

[30] Foreign Application Priority Data

Apr. 21, 1977 [DE] Fed. Rep. of Germany ....... 2717736

[51] Int. Cl.² ................ G03B 7/00; G03B 15/03; G03B 17/00
[52] U.S. Cl. ................................. 354/21; 354/149; 354/289
[58] Field of Search .................. 354/21, 26, 27, 28, 354/61, 289, 127, 139, 149, 275

[56] References Cited

U.S. PATENT DOCUMENTS

| 3,443,498 | 5/1969 | Bihlmaier | 354/149 X |
| 4,000,497 | 12/1976 | Galbraith | 354/21 |
| 4,101,914 | 7/1978 | Yamashita et al. | 354/289 X |
| 4,121,230 | 10/1978 | Ohmura et al. | 354/139 X |

FOREIGN PATENT DOCUMENTS 1472727 10/1969 Fed. Rep. of Germany ........... 354/149
2333020 1/1965 Fed. Rep. of Germany ........... 354/149

Primary Examiner—Donald A. Griffin
Attorney, Agent, or Firm—Peter K. Kontler

[57] ABSTRACT

A photographic apparatus wherein the diaphragm is adjustable by a reciprocable selector which is provided with indicia denoting the scene brightness and the distance from the subject. The shutter is adjustable in dependency on the position of the selector, in dependency on the speed of film which is confined in the apparatus and in dependency on the condition of the apparatus, namely, whether the apparatus is set for the making of exposures in daylight or with flash. Cassettes which are used in the apparatus have markers denoting the film speed, and such markers influence the position of a reciprocable follower which can pivot a control lever loosely coupled to a shutter adjusting lever. The latter is pivotable by the control lever or by a motion transmitting lever whose position changes when a flashcube is attached to or detached from the housing of the apparatus.

13 Claims, 9 Drawing Figures

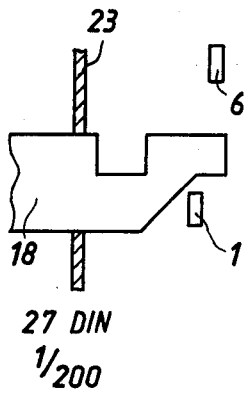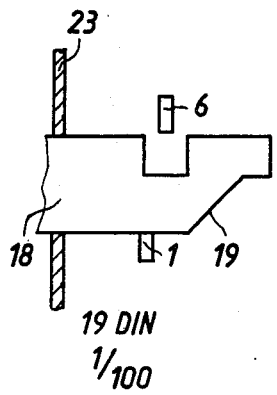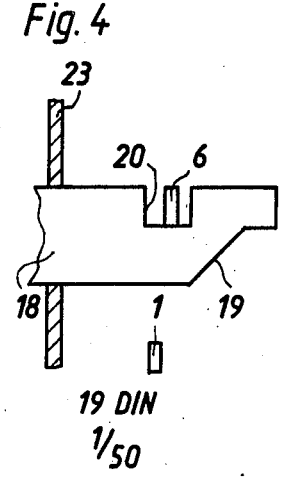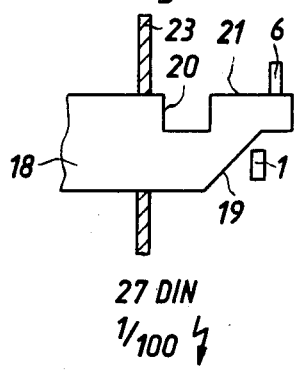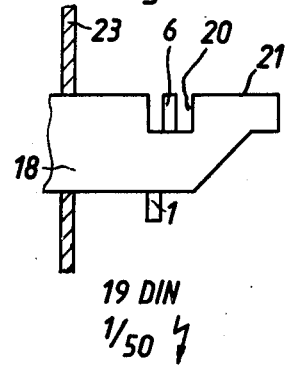

EXPOSURE CONTROLS FOR PHOTOGRAPHIC APPARATUS

BACKGROUND OF THE INVENTION

The present invention relates to photographic apparatus in general, and more particularly to improvements in exposure controls for photographic apparatus, especially for still cameras.

It is already known to adjust the exposure controls of a still camera in dependency on the sensitivity of photographic film which is confined in the housing of the camera. To this end, the container (e.g., a drop-in cassette) for photographic film is provided with markers in the form of projections, notches or the like whose position, depth, height and/or other characteristics are indicative of the film speed. It is further known to automatically select a fixed exposure time for the making of exposures with artificial illumination of the subject. Certain other cameras employ complex electronic exposure controls which monitor the intensity of scene light and the sensitivity of inserted film to automatically select an appropriate combination of exposure time and aperture size. All such cameras are either too simple or overly complex and expensive. Thus, there exists an urgent need for photographic apparatus which are simple, compact and inexpensive but are nevertheless sufficiently sophisticated to enable the user to adjust the exposure controls in a number of ways and in dependency on all important parameters which influence the quality of exposures while, at the same time, insuring that the user need not spend too much time for adjustment of exposure controls prior to picture taking.

OBJECTS AND SUMMARY OF THE INVENTION

An object of the invention is to provide a photographic apparatus, especially a still camera, which is not only simple and compact but also inexpensive in spite of the fact that it can furnish a large number of combinations of exposure values which can be selected in dependency on all or nearly all factors that normally influence the quality of exposures.

Another object of the invention is to provide a photographic apparatus which can furnish a large number of appropriate combinations of exposure time and aperture size during operation in daylight or artificial light as well as while the apparatus contains a film of average or high sensitivity.

A further object of the invention is to provide the apparatus with novel and improved means for adjusting the shutter in dependency on the nature of illumination, the distance from the subject, the intensity of scene light and/or the type of film whereby at least some of these adjustments are carried out automatically to simplify the task of the user during picture taking.

An additional object of the invention is to provide a photographic apparatus wherein the aperture size can be changed together with or independently of changes in the shutter speed and vice versa.

An ancillary object of the invention is to provide the apparatus with novel and improved means for selecting the aperture size in dependency on the distance from the subject and/or in dependency on the intensity of scene light.

The invention is embodied in a photographic apparatus which is convertible for the making of exposures in daylight and artificial light (such conversion can be effected by attaching a flashcube or an electronic flash unit to or detaching it from the housing of the photographic apparatus). The apparatus comprises a housing having a chamber for film containers which are provided with markers denoting the sensitivity of photographic film therein, a follower (e.g., a reciprocable slide) which is movably mounted in the housing and is displaceable by the marker of the inserted container to an extent which is a function of the sensitivity of film in such container (the displacement may be zero in response to proper insertion of a container having a marker of a first type and the displacement may be more or less pronounced in response to insertion of a container having a marker of a second type), selector means which is mounted in or on the housing and is movable (for example, by hand) between a plurality of positions each of which denotes a different intensity of scene light (to this end, the selector means may be provided with indicia denoting different intensities of light for the making of exposures in daylight and different distances from the subject for the making of exposures with artificial illumination of the subject), control means (e.g., a pivotable lever) which is movably mounted in the housing in the path of movement of the follower and also in the path of movement of the selector means so that the position of the control means is or can be a function of the position of selector means as well as or a function of the sensitivity of film in the inserted container, and exposure time selecting means including adjusting means (e.g., a lever which is pivotable about the axis of the lever which forms part of or constitutes the control means) movable between a plurality of positions each of which corresponds to a different exposure time. The adjusting means is located in the path of movement of the control means so that the control means can change the position of the adjusting means, and hence the exposure time, as a function of the sensitivity of film in the inserted container and/or as a function of the position of the selector means. The exposure time selecting means further comprises means (e.g., a reciprocable motion transmitting rod in combination with a lever) for moving the adjusting means in response to conversion of the apparatus from the making of exposures in one type of light to the making of exposures in the other type of light.

The selector means can be constructed and mounted in such a way that it moves the control means in response to movement to some (i.e., not all) of its positions. The adjusting means and the control means are preferably mounted for relative movement with respect to each other, and at least one of these means may be provided with means (e.g., a lug or the like) for limiting the extent of such relative movement.

The aforementioned moving means which is operative during or in response to conversion from operation in daylight to operation in artificial light of vice versa preferably includes motion transmitting means (such as the aforementioned rod-lever combination) which is movable from a first position to a second position in response to conversion from operation in daylight to the making of exposures in artificial light, and the adjusting means preferably comprises a portion which is located in the path of movement of the motion transmitting means and is movable by such motion transmitting means when the latter moves from one to the other of its (first and second) positions.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a diagrammatic view, substantially as seen in the direction of arrow II of FIG. 1, and shows the control means and the adjusting means in a first position while the apparatus contains a supply of high-speed film;

FIG. 3 is a similar view but showing the positions of the control means and adjusting means when the high-speed film is replaced with a supply of photographic film of average sensitivity;

FIG. 4 illustrates the structure of FIG. 3 and the positions of control means and adjusting means when the user decides to select a longer exposure time while the apparatus contains a supply film of average sensitivity;

FIG. 5 shows the structure of FIG. 2 and the positions of the control means and adjusting means while the apparatus contains a supply of high-speed film and is converted for the making of exposures with artificial illumination of the subject;

FIG. 6 shows the structure of FIG. 2 but with the control means and adjusting means in positions they assume upon conversion of the apparatus for operation with flash and while the apparatus contains a supply of photographic film of average sensitivity;

FIG. 7 is a table showing certain combinations of exposure time and aperture size which can be selected with the apparatus of FIG. 1;

DESCRIPTION OF THE PREFERRED EMBODIMENTS

Figure 1:
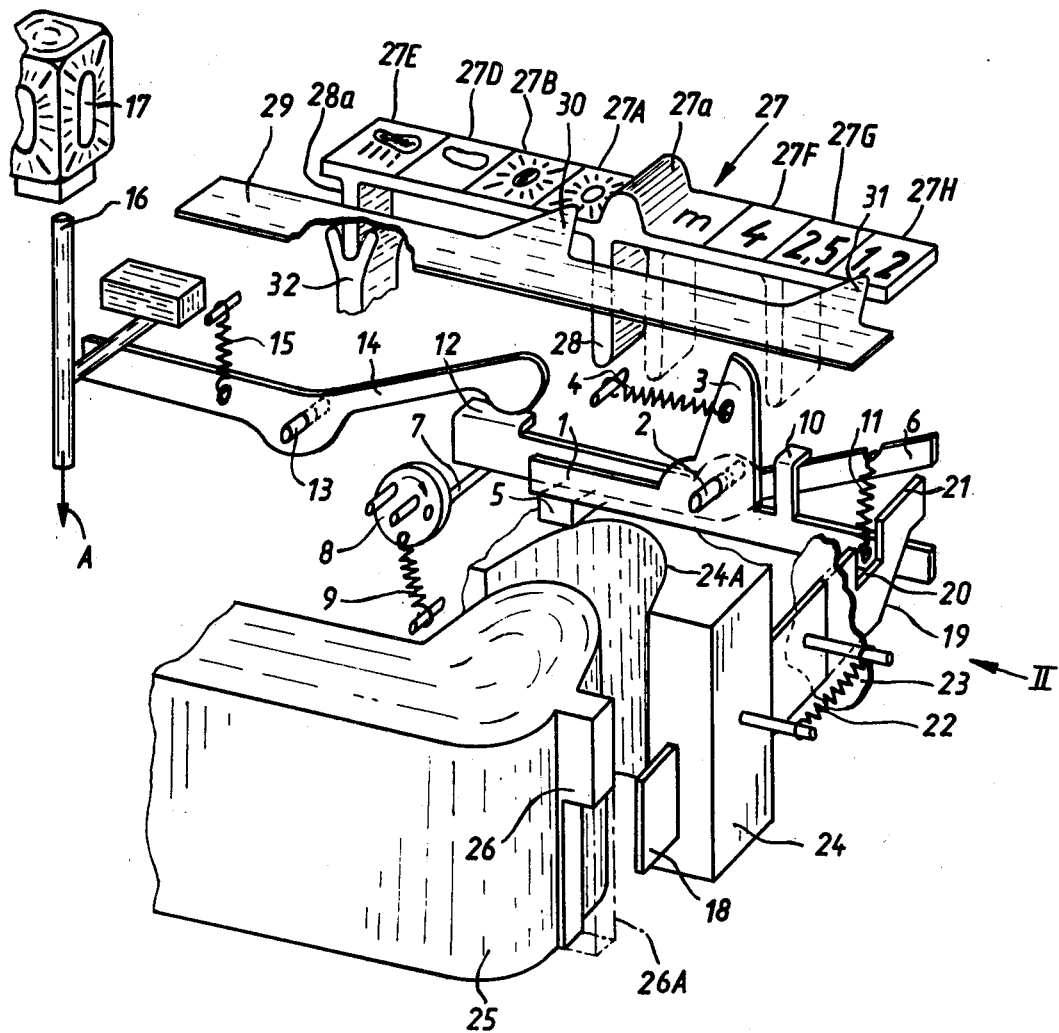
FIG. 1 is an exploded perspective view of a portion of a photographic apparatus which embodies one form of the invention.

Referring to FIG. 1, there is shown a portion of a photographic apparatus which comprises a housing or body having portions 23 and 24. A shaft 2 which is mounted in the housing supports a pivotable control lever 1 having an upwardly extending arm or portion 3 which is connected with one end of a helical spring 4. The other end of the spring 4 is connected to a post in the housing, and the spring 4 biases the control lever 1 in a counterclockwise direction, as viewed in FIG. 1, whereby the left-hand arm of the lever 1 normally abuts against a fixed stop 5. The shaft 2 further supports a pivotable exposure time adjusting lever 6 whose left-hand arm can turn a rotary shutter adjuster 8 which is rotatably mounted in the housing and has a post 7 extending into the path of movement of the left-hand arm of the lever 6. The shutter adjuster 8 is biased to a neutral position by a helical spring 9 which is connected to a post on the adjuster 8 and to a post in the housing of the photographic apparatus.

The right-hand arm of the control lever 1 has a substantially L-shaped projection or lug 10 which extends into the path of movement of the right-hand arm of the adjusting lever 6 to limit the extent to which the levers 1 and 6 are pivotable with respect to each other. A helical coupling spring 11 is connected to the right-hand arms of the levers 1 and 6 and tends to turn the lever 6 in a clockwise direction, as viewed in FIG. 1. A platform 12 at the free end of the left-hand arm of the adjusting lever 6 serves as an abutment for the right-hand arm of a motion transmitting lever 14 which is pivotable on a fixed shaft 13 and is biased in a clockwise direction by a strong helical spring 15 tending to maintain the lever 14 in contact with the platform 12. The bias of the spring 15 is more pronounced than that of the spring 11. The lever 14 can be pivoted against the opposition of the spring 15 by a motion transmitting rod 16 which is biased upwardly, as viewed in FIG. 1 (e.g., by the spring 15) and can be depressed in the direction indicated by arrow A in response to attachment of a source 17 of artificial light (e.g., a flashcube) to the housing of the photographic apparatus, i.e., in response to conversion of the apparatus from the making of exposures in daylight to the making of exposures in artificial light.

A follower 18, here shown as a reciprocable slide whose position is indicative of the sensitivity of film in the housing of the photographic apparatus, has a portion which extends between the right-hand arms of the levers 1 and 6. The sensitivity can be indicated in accordance with German (DIN) norms. The follower 18 has a first cam face 19 which is tracked by the right-hand arm of the control lever 1 and a second face 21 which can be engaged by the right-hand arm of the adjusting lever 6 and has a recess 20. A helical spring 22 is attached to the follower 18 and to the housing portion 24 and tends to move the follower in a direction toward the observer of FIG. 1. The housing portion 23 has a slot which slidably guides an intermediate portion of the follower 18 and registers with a similar slot in the housing portion 24.

The follower 18 can be shifted against the opposition of the spring 22 by a marker 26A (indicated by phantom lines) which is provided on a film container or cassette loaded with photographic film of average speed (e.g., 19 DIN). The cassette 25 which is sown in FIG. 1 has a relatively short marker 26 which cannot engage the follower 18, i.e., the position of the follower is not changed when the cassette 25 is properly inserted into the housing of the photographic apparatus. A portion of the chamber which receives a properly inserted cassette is shown at 24A. The cassette 25 of FIG. 1 is assumed to contain high-speed photographic film (e.g., 27 DIN).

The photographic apparatus further comprises a reciprocable selector 27 which has a substantially centrally located handgrip portion 27a and carries two sets of indicia. The left-hand indicia 27A, 27B, 27D, 27E (whose meaning is self-explanatory) will be considered when the user of the photographic apparatus wishes to make exposures in daylight. The right-hand indicia 27F, 27G, 27H designate various distances from the subject and are considered when the apparatus is converted for the making of exposures in artificial light, e.g., by means of the flashcube 17. A downwardly extending entraining protuberance or pusher 28 of the selector 27 can engage the arm 3 to pivot the control lever 1 when the selector 27 is shifted in a direction to the right, as viewed in FIG. 1. A second downwardly extending protuberance 28a of the selector 27 engages a mobile diaphragm adjusting device 32. An elongated bar 29 in the housing of the photographic apparatus has two spaced-apart pointers 30 and 31 which respectively serve to pinpoint the selected left-hand and right-hand indicia on the selector 27.

The table of FIG. 7 indicates various advantageous combinations of exposure times and aperture sizes for picture-taking under circumstances which are denoted by the indicia on the selector 27. It is assumed that the photographic apparatus is to be used with films of average speed (19 DIN) or with high-speed films (DIN 27). For example, when the weather is partly cloudy (see the indicium 27B) and the user wishes to make an exposure with 19 DIN photographic film, the selector 27 will automatically adjust the exposure controls to furnish an f/stop of 11 and an exposure time of 1/100 second. If the user wishes to make an exposure with artificial illumination of the subject at a distance of approximately 2.5 meters from the most important part of the subject (see the indicium 27G), and the apparatus is loaded with 27 DIN film, the selector 27 will again adjust the exposure controls of the photographic apparatus to furnish an f/stop of 11 and an exposure time of 1/100 second.

The operation is as follows:

It is assumed that the chamber 24A contains a cassette with 27 DIN film. The follower 18 is held in the position which is shown in FIG. 2. The levers 1 and 6 are held in the positions corresponding to those shown in FIG. 1. The spring 4 biases the control lever 1 against the stop 5 and the motion-transmitting lever 14 maintains the adjusting lever 6 in engagement with the post 7 whereby the spring 11 stores energy and the post 7 maintains the adjuster 8 in an angular position in which the shutter is set to furnish an exposure time of 1/200 second. Without causing its protuberance 28 to engage the arm 3 of the control lever 1, the selector 27 can be shifted from the illustrated position (pointer 30 in register with the indicium 27A) in which the diaphragm defines an f/stop of 22 to a second position (the pointer 30 registers with the indicium 27B) whereby the diaphragm furnishes an f/stop of 11, or to a third position (pointer 30 in register with the indicium 27D) whereby the diaphragm furnishes an f/stop of 8. Thus, whereas the f/stop changes, the selected exposure time (1/200 second) remains unchanged.

If the cassette 25 with 27 DIN film is replaced with a cassette which contains 19 DIN film, the marker 26A of such cassette engages and shifts the follower 18 to the position which is shown in FIG. 3. Thus, the cam face 19 pivots the control lever 1 clockwise, as viewed in FIG. 1, and the lug 10 of the control lever 1 entrains the adjusting lever 6 which assumes the position of FIG. 3 whereby the adjuster 8 is caused to select an exposure time of 1/100 second. Without moving its protuberance 28 into engagement with the arm 3 of the control lever 1, the selector 27 can be shifted to move the indicium 27A, 27B or 27D into register with the pointer 30 whereby the diaphragm respectively defines f/stops of 22, 11 and 8 (see the table of FIG. 7).

If the selector 27 is shifted to place the indicium 27E into register with the pointer 30, the protuberance 28 pivots the control lever 1 clockwise, as viewed in FIG. 1. The lug 10 of the lever 1 pivots the adjusting lever 6 in the same direction so that the adjuster 8 sets the shutter for an exposure time of 1/50 second. The corresponding positions of the levers 1 and 6 are shown in FIG. 4.

If the user desires to convert the photographic apparatus for the making of exposures with artificial illumination of the subject, the base of the flashcube 17 is inserted into the socket (not shown) of the housing of the photographic apparatus whereby the properly inserted flashcube depresses the motion transmitting rod 16 (arrow A) and the rod 16 pivots the motion-transmitting lever 14 in a counterclockwise direction, as viewed in FIG. 1. The spring 15 stores energy and the lever 14 releases the adjusting lever 6 which pivots counterclockwise under the action of the spring 11. If the apparatus is loaded with 27 DIN film (see FIG. 5), the face 21 of the follower 18 holds the adjusting lever 6 in a position in which the shutter furnishes an exposure time of 1/100 second (see also FIG. 7).

If the 27 DIN film is replaced with 19 DIN film, the follower 18 is shifted to the position of FIG. 6 in which the right-hand arm of the adjusting lever 6 is free to enter the recess 20 which is provided in the face 21 whereby the shutter is set to furnish an exposure time of 1/50 second. A comparison of FIG. 6 with FIG. 3 will show that the right-hand arm of the adjusting lever 6 is always in register with the recess 20 when the chamber 20A contains a cassette with 19 DIN film, and that the right-hand arm of the adjusting lever 6 is free to enter the recess 20 whenever the arm 3 of the control lever 1 is engaged and pivoted by the protuberance 28 (FIG. 4) or the adjusting lever 6 is free to pivot under the action of the spring 11 (FIG. 6).

An important advantage of the improved apparatus is its simplicity and low cost. Nevertheless, the apparatus enables the user to select a large number of appropriate combinations of exposure time and aperture size as a function of several factors including the sensitivity of inserted film, the condition of the apparatus (i.e., whether the apparatus is set for the making of exposures in daylight or artificial light), the intensity of scene light and the distance from the subject. Moreover, the sensitivity of inserted film can influence the exposure time and the aperture size while the apparatus is set for the making of exposures in daylight as well as when the apparatus is ready for operation with artificial illumination of the subject. This is achieved by the provision of the control lever 1 which extends or can extend into the path of movement of the protuberance 28 on the manually movable selector 27 (while the selector 27 moves to at least one of its positions) and which further extends into the path of movement of the follower 18. Thus, the control lever 1 which, in turn, influences the position of the adjusting lever 6 and hence the exposure time, can be moved in dependency on the intensity of scene light or the distance from the subject as well as in dependency on the sensitivity of film in the inserted cassette. The right-hand arms of the levers 1 and 6 (as viewed in FIG. 1) resemble the blades of shears and can move apart to the extent permitted by the lug 10. Since the follower 18 extends into the space between such arms of the levers 1 and 6, it can directly or indirectly change the position of the lever 1 and/or 6. Thus, the cam face 19 can engage and pivot the control lever 1 and the recess 20 in the face 21 enables the adjusting lever 6 to move under the bias of the spring 11 or under the action of the lug 10, i.e., in response to movement of the selector 27 to at least one predetermined position (pointer 30 in register with the indicium 27E). As shown in FIGS. 5 and 6, the follower 18 can intercept the adjusting lever 6 in two different positions to thus insure that the exposure time is influenced by the sensitivity of inserted photographic film. As mentioned above, the adjusting lever 6 will engage the surface at the bottom of the recess 20 when the flashcube 17 disengages the motion transmitting lever 14 from the platform 12 so that the lever 6 can follow the bias of the coupling spring 11 and selects a relatively long exposure time for the making of exposures with artificial illumination of the subject when the camera contains a supply of low-speed film.

An advantage of the stop 5 is that the spring 4 is free to maintain the control lever 1 in a predetermined position when the lever 1 is not engaged by the protuberance 28 and/or cam face 19. This insures that the exposure time is constant, namely, that such exposure time assumes a first value which remains unchanged as long as the flashcube remains attached to the housing of the apparatus or a second value which remains unchanged as long as the flashcube remains detached from the housing.

The feature that the selector 27 can move relative to the control lever 1 to some of its positions renders it possible to select any one of several combinations of exposure time and aperture size while one of these values remains unchanged. Thus, and as explained above, the exposure time will remain unchanged when the control lever 1 abuts against the stop 5 and the user of the photographic apparatus moves the selector 27 so as to place the indicium 27A, 27B or 27D into register with the pointer 30.

Figure 8:
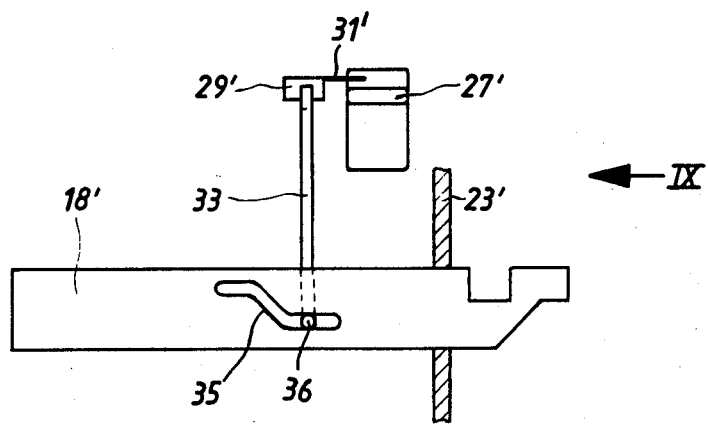
FIG. 8 is a diagrammatic view of a portion of a slightly modified photographic apparatus.
Figure 9:
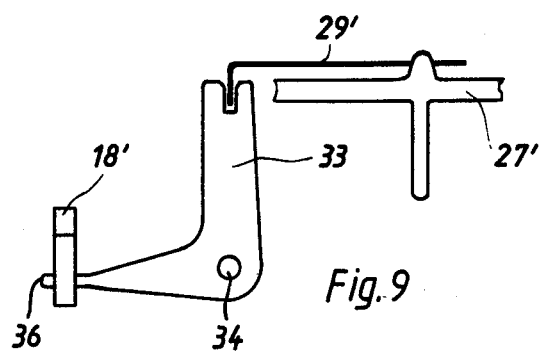
FIG. 9 is a view as seen in the direction of arrow IX in FIG. 8.

FIGS. 8 and 9 illustrate portions of a modified photographic apparatus. All such parts which are identical with or analogous to corresponding parts of the apparatus of FIG. 1 are denoted by similar reference characters each followed by a prime. The follower 18' can pivot a lever 33 coupled to the member 29' which is movable relative to the selector 27'. In other words, the member 29' is automatically shifted to account for the sensitivity of film in the photographic apparatus. One of the pointers on the member 29' is shown at 31'. The shaft which is mounted in the housing and pivotably supports the lever 33 is indicated at 34. The follower 18' has a cam slot 35 for a pin 36 at the free end of one arm of the lever 33. The articulate connection between the lever 33 and the follower 18' is such that the member 29' is moved by the spring 22 (not shown in FIGS. 8 and 9) when the housing contains 27 DIN film, and that the member 29' is moved by the marker 26A when the housing contains 19 DIN film.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In a photographic apparatus which is convertible for the making of exposures in daylight and artificial light, the combination of
   (1) a housing having a chamber for containers provided with markers denoting the sensitivity of film therein;
   (2) a follower movably mounted in said housing and being displaceable by the marker of the inserted container to an extent which is a function of the sensitivity of film in such container;
   (3) selector means mounted in said housing and movable between a plurality of positions each of which denotes a different intensity of scene light;
   (4) control means movably mounted in said housing in the path of movement of said follower and also in the path of movement of said selector means so that the position of said control means is a function of the position of said selector means as well as a function of the sensitivity of film in the inserted container; and
   (5) exposure time selecting means including adjusting means movable between a plurality of positions each of which corresponds to a different exposure time, said adjusting means being located in the path of movement of said control means so that said control means can change the position of said adjusting means and hence the exposure time as a function of the sensitivity of film in the inserted container and/or as a function of the position of said selector means, and means for moving said adjusting means in response to conversion of said apparatus from the making of exposures in one type of light to the making of exposures in the other type of light.

2. The combination of claim 1, wherein said selector means comprises means for moving said control means in response to movement of said selector means between some of said plurality of positions.

3. The combination of claim 1, wherein said adjusting means and said control means are movable relative to each other and at least one thereof comprises means for limiting the extent of such relative movement.

4. The combination of claim 1, wherein said moving means comprises motion transmitting means movable from a first to a second position in response to conversion of said apparatus from the making of exposures in daylight to the making of exposures in artificial light, said adjusting means having a portion located in the path of movement of said motion transmitting means and being movable by said motion transmitting means while the latter moves from one to the other of said first and second positions.

5. The combination of claim 1, wherein said adjusting means includes a portion located in the path of movement of said follower so that the position of said adjusting means is directly dependent on the sensitivity of film in the inserted container in at least one position of said follower.

6. The combination of claim 1, wherein said control means and said adjusting means respectively comprise first and second levers pivotable relative to each other about a common axis and one of said levers comprises means for limiting the extent of movement of the other of said levers relative to said one lever.

7. The combination of claim 6, further comprising resilient coupling means for pivoting one of said levers in response to pivoting of the other of said levers.

8. The combination of claim 7, wherein said moving means includes second resilient means arranged to bias said second lever counter to the direction in which said second lever is biased by said coupling means, the bias of said second resilient means exceeding the bias of said coupling means.

9. The combination of claim 1, further comprising stationary stop means in said housing and means for permanently biasing said control means against said stop means.

10. The combination of claim 9, wherein said stop means is positioned to arrest said control means when the latter is disengaged from said follower and from said selector means.

11. The combination of claim 1, further comprising diaphragm adjusting means coupled to and movable by said selector means, said positions of said selector means including at least one first and at least one second position, said selector means being arranged to move relative to said control means and to move said diaphragm adjusting means during movement to said first position and to move said control means as well as said diaphragm adjusting means during movement to said second position thereof.

12. The combination of claim 1, wherein said selector means comprises a plurality of indicia each denoting a different one of said positions and further comprising pointer means movably mounted in said housing adjacent said indicia and means for moving said pointer means relative to said indicia in response to displacement of said follower.

13. The combination of claim 12, wherein said means for moving said pointer means includes a lever pivotably mounted in said housing and articulately connected with said follower.

* * * * *